(12) United States Patent
Canning et al.

(10) Patent No.: US 10,834,133 B2
(45) Date of Patent: Nov. 10, 2020

(54) MOBILE DEVICE SECURITY POLICY BASED ON AUTHORIZED SCOPES

(71) Applicant: International Business Machines Corporation, Armonk, NY (US)

(72) Inventors: Simon Gilbert Canning, Upper Coomera (AU); David Paul Moore, Burleigh Waters (AU); Shane Bradley Weeden, Paradise Point (AU); Stephen Viselli, Southport (AU)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 13/693,479

(22) Filed: Dec. 4, 2012

(65) Prior Publication Data
US 2014/0157351 A1 Jun. 5, 2014

(51) Int. Cl.
*H04L 29/06* (2006.01)
*H04W 12/00* (2009.01)

(52) U.S. Cl.
CPC .............. *H04L 63/20* (2013.01); *H04L 63/10* (2013.01); *H04W 12/0027* (2019.01)

(58) Field of Classification Search
CPC . G06F 21/31; G06F 2221/2145; H04L 63/10; H04L 63/08; H04L 63/105; H04L 63/20; H04L 67/14; H04W 12/0027
USPC ........................................................ 726/1–6
See application file for complete search history.

(56) References Cited

U.S. PATENT DOCUMENTS

| | | | | |
|---|---|---|---|---|
| 6,460,141 B1* | 10/2002 | Olden | ................... | G06F 21/604 726/12 |
| 7,305,562 B1* | 12/2007 | Bianco | .................... | H04L 63/08 709/229 |
| 7,441,263 B1* | 10/2008 | Bakshi | .................. | G06F 21/335 709/223 |
| 7,490,347 B1 | 2/2009 | Schneider et al. | | |
| 7,584,508 B1 | 9/2009 | Kashchenko et al. | | |
| 7,607,174 B1 | 10/2009 | Kashchenko et al. | | |
| 7,720,864 B1* | 5/2010 | Muth et al. | ................... | 707/785 |
| 9,275,204 B1* | 3/2016 | Orr | ......................... | G06F 21/30 |
| 2003/0131102 A1* | 7/2003 | Umbreit | ....................... | 709/224 |
| 2004/0167984 A1* | 8/2004 | Herrmann | ..................... | 709/229 |
| 2005/0177724 A1* | 8/2005 | Ali et al. | ...................... | 713/168 |

(Continued)

OTHER PUBLICATIONS

Gail L. Grant "Understanding digital signatures", 1998, McGraw-Hill, 298 pages—provided except from pp. 35-36 (Year: 1998).*

*Primary Examiner* — Catherine Thiaw
(74) *Attorney, Agent, or Firm* — Jeffrey S. LaBaw; David H. Judson (57) ABSTRACT

A technique to enforce mobile device security policy is based on a "risk profile" of the individual device, where the risk profile is fine-grained and based on the types of applications installed on the device, the services they are accessing, and the operation(s) the user granted the device authorization to perform. Thus, the approach takes into account not only the actual applications installed on the device (and those actively in use), but also the services those applications are accessing, and the scope of operations the user has granted the device authorization to perform. By combining this information to create the risk profile, a suitable security policy, including one that does not unnecessarily degrade device usability, may then be applied.

26 Claims, 3 Drawing Sheets

(56) References Cited

U.S. PATENT DOCUMENTS

| | | | |
|---|---|---|---|
| 2006/0224742 A1* | 10/2006 | Shahbazi | 709/226 |
| 2007/0143824 A1 | 6/2007 | Shahbazi | |
| 2007/0180503 A1* | 8/2007 | Li et al. | 726/5 |
| 2007/0186106 A1* | 8/2007 | Ting et al. | 713/168 |
| 2008/0028453 A1* | 1/2008 | Nguyen et al. | 726/9 |
| 2009/0165125 A1* | 6/2009 | Brown et al. | 726/21 |
| 2009/0205018 A1* | 8/2009 | Ferraiolo et al. | 726/1 |
| 2010/0031334 A1* | 2/2010 | Shaikh | G06F 21/35 726/7 |
| 2010/0071035 A1* | 3/2010 | Budko et al. | 726/4 |
| 2010/0077445 A1 | 3/2010 | Schneider et al. | |
| 2010/0100925 A1* | 4/2010 | Hinton | 726/1 |
| 2012/0011560 A1 | 2/2012 | Natarajan et al. | |
| 2012/0198512 A1* | 8/2012 | Zhou et al. | 726/1 |
| 2013/0047215 A1* | 2/2013 | Radhakrishnan et al. | 726/4 |
| 2013/0086645 A1* | 4/2013 | Srinivasan et al. | 726/4 |
| 2013/0162753 A1* | 6/2013 | Hendrickson | H04L 12/1818 348/14.08 |
| 2013/0283340 A1* | 10/2013 | Biswas et al. | 726/1 |
| 2014/0007222 A1* | 1/2014 | Qureshi | G06F 21/10 726/16 |
| 2014/0058875 A1* | 2/2014 | Yanchenko | 705/26.3 |
| 2014/0096177 A1* | 4/2014 | Smith et al. | 726/1 |

* cited by examiner

MOBILE DEVICE SECURITY POLICY BASED ON AUTHORIZED SCOPES

BACKGROUND OF THE INVENTION

1. Technical Field

This disclosure relates generally to information security and, in particular, to a policy-based approach to secure enterprise data on mobile devices.

2. Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many such devices use open mobile operating systems, such as Android. The ubiquity, performance and low cost of mobile devices have opened the door for creation of a large variety of mobile applications.

Enterprises are now providing their workforce with mobile devices to enable them to work from anywhere. In addition, enterprise employees also are using their personal mobile devices to connect to enterprise networks to enable them to work from remote locations. Organizations also are exploring the potential of bring your own device (BYOD) in the workplace, wherein employees own their devices but use them to run enterprise applications. Under these various scenarios, enterprises need to consider the implications of mobile devices on enterprise security and, more specifically, they need to ensure that sensitive enterprise data does not leak through these devices. Other security risks presented by such scenarios include the impact (to the enterprise) of lost or stolen devices, the management of confidential information, and the capability for unauthorized access to the corporate network. The management of security risks in this type of environment is a complex problem for which, currently, there are no adequate solutions.

Thus, for example, in a typical use scenario, an end user runs both enterprise and personal applications concurrently on a smartphone. This operating scenario presents many potential problems. Because these devices do not include on-device mechanisms for controlling resident data usage, and because users have no control over data once they authorize access by their resident applications, there is no way to protect sensitive enterprise data from arbitrary application and modifications. Further, because (from the device's perspective) all applications are assumed to be equal, there is no way to prevent information leakage between enterprise and personal applications. Indeed, this information leakage is exacerbated by open interface mobile operating systems (such as Android), which are designed to allow data sharing among applications. Further, because mobile device operating systems can be jail-broken or otherwise rooted to override existing security mechanisms and install malicious software, there is no effective way to manage the integrity of software running on the device. Indeed, because end users can download and install virtually any application without knowledge of the application's security behavior, it is very difficult to control applications (or their runtime behavior) once installed on the device.

Typically, and in part because of the possibility for information leakage, organizations often impose security requirements for mobile devices that do not conform well with respect to device usability, and that do not consider the type of information being accessed on the device. One example is a security policy requirement that all devices with access to an organization's virtual private network (VPN) via a VPN client application be secured at all times with a lengthy (e.g., 8 digit) pin code. One the one hand, this requirement makes it less likely that enterprise information on the device will fall into the wrong hands but, at the same time, it also greatly reduces the usability of the device, especially when the device is not being used to access enterprise confidential information.

The requirements of a security policy in the context of a mobile device that supports both enterprise and personal applications thus needs to balance the information security requirements of the enterprise while at the same time not impairing the usability of the device itself.

BRIEF SUMMARY

According to this disclosure, a technique to enforce mobile device security policy is based on a "risk profile" of the individual device, where the risk profile is fine-grained and based on the types of applications installed on the device, the services they are accessing, and the operation(s) the user granted the device authorization to perform. Thus, the approach takes into account not only the actual applications installed on the device (and those actively in use), but also the services those applications are accessing, and the scope of operations the user has granted the device authorization to perform. By combining this information to create the risk profile, a suitable security policy, including one that does not unnecessarily degrade device usability, may then be applied.

In one embodiment, a system that implements the above-described technique uses an authorization server to track an "authorization scope" for applications on a per-device basis. An authorization scope refers to the scope of operations the user has granted the device authorization to perform. The approach preferably uses real-time scope parameters for user-delegated authorization to determine the security policy required on the device and preferably based on the services the device is actually accessing. The system uses a security policy enforcement point (PEP) to then enforce device security policy on authorized scope for particular device applications at the time the applications are used. The approach provides for a way to generate and enforce and device-specific risk profile that vastly improves usability of the mobile device without impairing enterprise security requirements.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
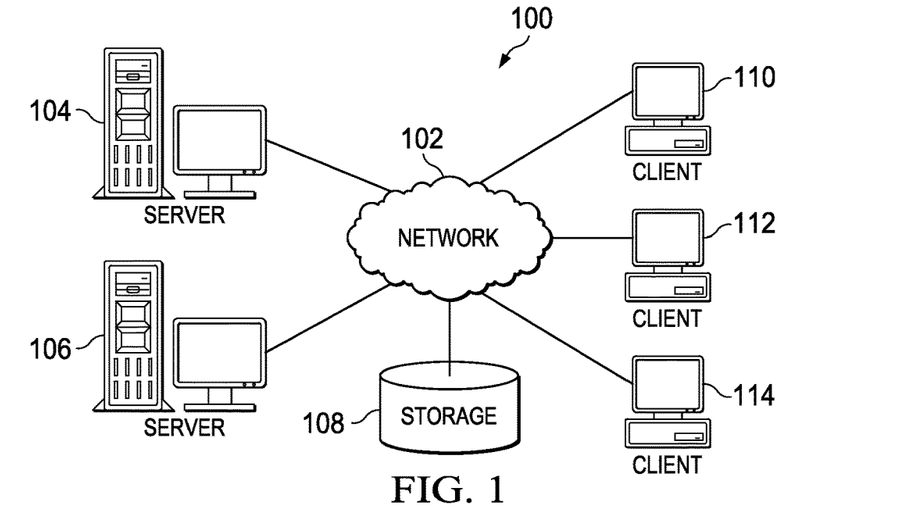
FIG. 1 depicts an exemplary block diagram of a distributed data processing environment in which exemplary aspects of the illustrative embodiments may be implemented.
Figure 2:
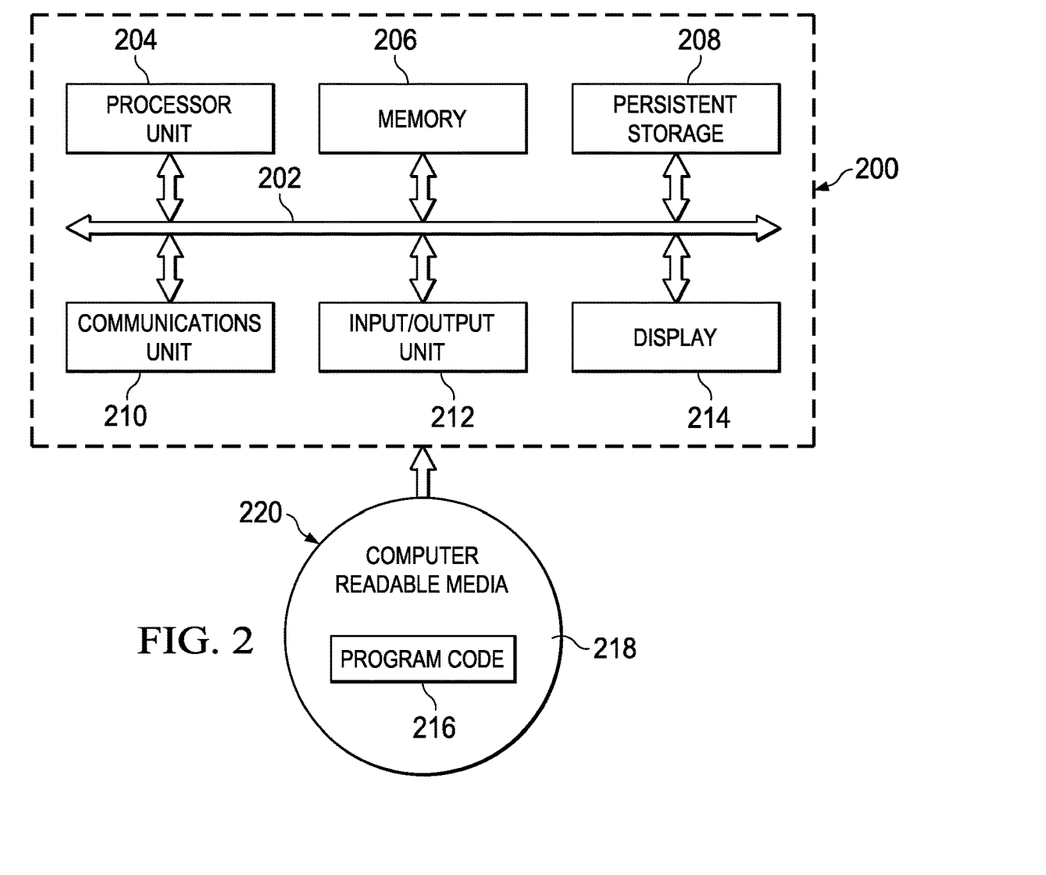
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
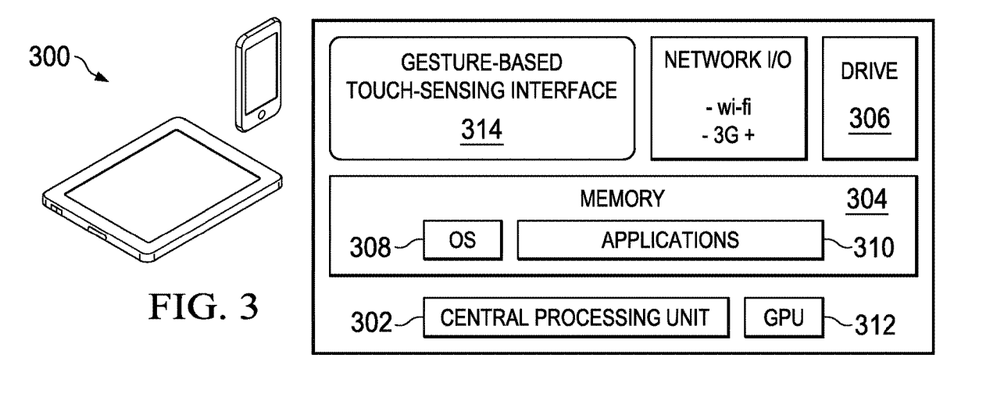
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, Windows Phone, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Enterprise Policy Management

Figure 4:
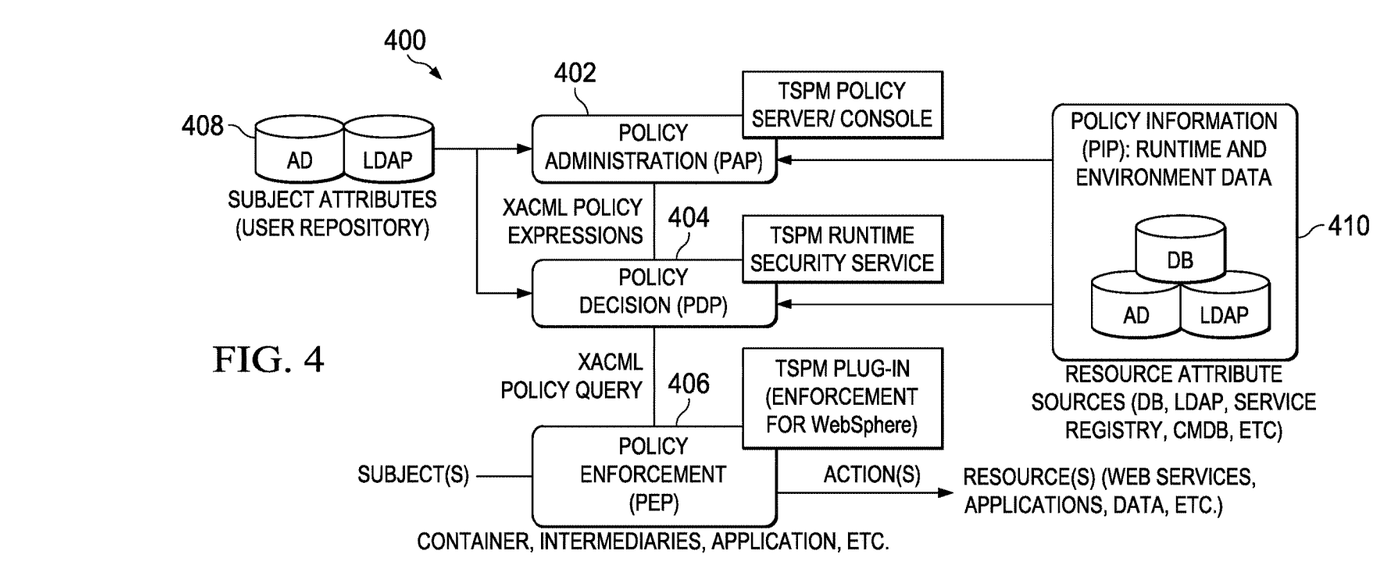
FIG. 4 illustrates a known enterprise policy management system for authoring, distributing and enforcing enterprise policies.

FIG. 4 illustrates a representative enterprise policy management system 400 that is known in the art. The system 400 may be implemented across one or more machines operating in a computing environment, such as shown in FIG. 1. Typically, the system comprises a policy administration point (PAP) 402, the policy decision point (PDP) 404, and a policy enforcement point (PEP) 406. Generally, the policy administration point 402 is used to define a policy, which may be specified as a set of XACML policy expressions. This policy uses subject attributes provided from a user repository 408, as well runtime and environment data received from policy information point (PIP) 410. The policy decision point (PDP) 404 receives similar information and responds to an XACML policy query received from the policy enforcement point (PEP) 406 to enforce the policy on a subject and with respect to a particular action initiated by the subject. The PDP 404 implements the policy decision. In one commercial implementation of this approach, the PAP 402 is implemented by IBM® Tivoli® Security Policy Manager (TSPM) policy service/console, the PDP 404 is implemented in the TSPM runtime security service, and the PEP is implemented as a TSPM plug-in to application server, such as IBM WebSphere® Application Server.

The policy management system may be implemented using one or more computing machines, such as shown in FIG. 2.

The policy administration point typically includes a web-based user interface by which an enterprise privacy policy may be authored and distributed.

Mobile Device Security Policy Based on Authorized Scopes

With the above as background, the subject matter of this disclosure is now described.

According to this disclosure, it is assumed that end users operate mobile devices that support both enterprise applications, as well as personal applications. As used herein, an "enterprise" application is an application that includes an application adapted to be executed in an enterprise computing environment using an access component that resides on the end user mobile device. The enterprise environment may be broadly construed as hardware and software computing resources (including those that are potentially cloud-based) that are within the administrative and management domain of the enterprise. The physical location of the enterprise application is not limited to any particular facility, location, or the like. An end user of a mobile device receives and installs an access component that enables the user of the mobile device to access the server-side of the enterprise application. This basic operation is described above with respect to FIG. 1. A "personal" application is any application that is not an enterprise application. Typically, a personal application is one that is available on the device as configured and provided to the end user, or it may be an application that is downloaded and installed on the device thereafter. A typical personal application is one that is purchased or otherwise obtained from an application store, a web site, or otherwise.

The enterprise operates a policy management system, such as described above with respect to FIG. 4.

According to this disclosure, and as described above, a technique to enforce mobile device security policy is based on a "risk profile" of the individual device, where the risk profile is fine-grained and based on the types of applications installed on the device, the services they are accessing, and the operation(s) the user granted the device authorization to perform. Thus, the approach takes into account the actual mobile application(s) installed on the device (and those actively in use), the service(s) (typically one or more back-end applications supported in or in association with the enterprise) those mobile applications are accessing, and the scope of operations the user has granted the device authorization to perform. By combining this information to create the risk profile, a suitable security policy, including one that does not unnecessarily degrade device usability, may then be applied.

Figure 5:
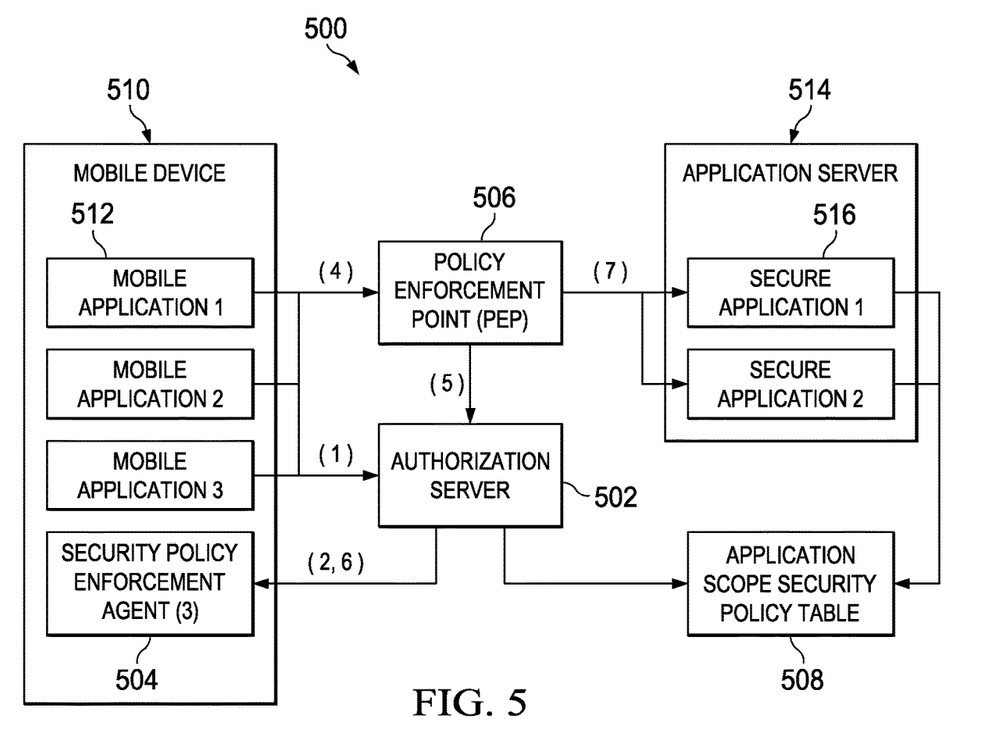
FIG. 5 illustrates a mobile device security platform and framework according to this disclosure.

FIG. 5 illustrates a system that implements the above-described technique. As will be described, the system uses an authorization server to track an "authorization scope" for applications on a per-device basis. As described above, an authorization scope refers to the scope of operations the user has granted the device authorization to perform. As will be seen, the approach preferably uses real-time scope parameters for user-delegated authorization to determine the security policy required on the device and preferably based on the services the device is actually accessing. The system uses a security policy enforcement point (PEP) to then enforce device security policy on authorized scope for particular device applications at the time the applications are used. The approach provides for a way to generate and enforce and device-specific risk profile that vastly improves usability of the mobile device without impairing enterprise security requirements.

With reference to FIG. 5, the solution 500 comprises a set of components: an authorization server 502, a security policy enforcement agent 504, policy enforcement point (PEP) 506, and an application scope security policy table 508. The authorization server 502 and policy enforcement point 506, together with the security policy table, typically are hosted in (or in association with) an enterprise environment. These components and data structures may be co-located, or they distributed from one another or even hosted (in whole or part) in a cloud-based environment. Typically, the authorization server and the policy enforcement point are software programs that are stored in computer memory and executed in hardware in one or more computing entities. The security policy enforcement agent 504 is a software program (e.g., Java-based code) that executes in a user mobile device 510 operating environment. Mobile device 510 also hosts and executes one or more mobile applications 512. A mobile application 512 may be a personal application or an enterprise application, as described above. The enterprise also includes or provides access to at least one application server 514 that hosts or otherwise enables access to one or more secure back-end applications 516. Generally, a mobile application 512 (that is authorized to do so) obtains a service from a secure application 516.

The solution 500 enables the creation and enforcement of a device- and authorized scope-specific security policy for the mobile device. As noted above, "authorized scope" refers to the scope of operations that the user has granted the device authorization to perform. According to the solution, the application scope security policy table 508 stores device-specific application scope security mappings. Each secure back-end application 516 updates the table with information about their status including, for example, the application operating state, what device(s) have authorized access to the application, the identification and scope of any security policy that may apply to that application, and the like. In one embodiment, the application scope security policy table is a lookup table that maps a back-end application 516 and its associated authorized scope to a security policy requirement level. This level defines the security policy requirements for the device and is adapted to be interpreted by the mobile device security policy enforcement agent 504. When the device may interface to multiple back-end applications, there may be multiple application/scope combinations for the mobile device stored in the table.

The operation of the solution is now described.

At step (1), a mobile application 512 (or the user) determines it needs access to a service (e.g., a service provided by one of the secure back-end applications 516). The mobile device application 512 thus directs the user (e.g., via a message prompt or other man-machine interface) to authenticate to the authorization server 502 to grant authorization to the device. This may involve prompting the user to enter his or her username and password on a one time basis; preferably, these credentials are not saved on the device to prevent misuse. Thus, according to step (1), the user delegates the device authorization to perform an access to the back-end application. Of course, the enterprise itself must consider such delegation permissible in the first instance. At step (2), and if the user chooses to grant (delegate) authorization, the authorization server 502 notifies the security policy enforcement agent 504 on the device that a risk profile of the device has changed (as a result of the newly-authorized scope of access) and that the security policy on the device may need to change accordingly. At step (3), the security policy enforcement agent 504 is responsible for notifying the user that one or more additional security constraint(s) are (or may then be) required. These additional security constraints typically are determined by the enterprise security policy. Thus, for example, an additional constraint may be that access to the secure application requires (to obtain access) some higher level of security such as a longer or more complex password, or the like.

Once the additional security constraint(s) have been provided to the user and then met, the security policy enforcement agent 504 notifies the authorization server 502. The one or more additional security constraint(s) may be quite varied, e.g., increasing the device password length or complexity, enabling voice or facial recognition, or the like. The particular security constraint imposed is not a limitation of the solution. If the security constraint(s) are not then met, the authorization server 502 refuses to grant the mobile application 512 an authorization token (which would otherwise be needed to access the secure application). In an alternative embodiment, enforcement of a particular security constraint may be optional but may still further restrict use of the mobile application depending upon whether or not it has (or they have) been met. Thus, for example, the user might start up his or her phone and be presented with a prompt such as "I will be using sensitive business applications (enter 8 digit pin code)" or "I will only be using non-sensitive business applications (press unlock)." Of course, these are merely representative examples. At step (4), and once the security policy on the device has been updated and the mobile application 512 has received an authorization token from the authorization server 502, the mobile application 512 presents the token to the policy enforcement point 506 to access the protected server application 516. Optionally, the mobile application 512 may receive from the security policy enforcement agent 504 a signed version of the current security policy, in which case the mobile application 512 may present the PEP 506 with the token and the signed version. The latter information may be provided to the PEP by the mobile application via an X-Policy-Version request header, via a separate HTTP POST, or the like. The data in the request header encapsulates what real-time policy the user is currently using, such as whether or not the user unlocked the phone with an 8-digit PIN, or whether the user took some other action required by the added security constraint.

At step (5), the policy enforcement point 506 validates the token with the authorization server 502. If sent, the policy enforcement point 506 also validates the X-Policy-Version header (or its alternative) to ensure that the appropriate policy has been applied at the device for this particular application access. If the required policy was not enforced, however, the authorization server 502 denies access (and may revoke the authorization token).

As step (6), the authorization server 502 may contact the security policy enforcement agent 504 on the device 510 to make sure that the security policy associated with the authorization scope bound to the authorization token and current application being used is still enforced. This step also is optional, as it may not be efficient to contact the device every time a request to a secure back-end server application is made. Thus, an alternative is to cache the result of this call (by the authorization server to the enforcement agent) for a certain amount of time. When the call is used, if the required policy was not still enforced, the authorization server 502 denies access (and may revoke the authorization token).

At step (7), and assuming the authorization server 502 validates the authorization token successfully, the authorization server allows the request from the mobile application 512 to continue through (the PEP) to the protected back-end server application 516. This completes the processing.

To ensure real-time validation of the required security policy, one or both of the optional checks (i.e., that the real-time policy the user is currently using has been applied at the device for this application access, and that the policy with the scope bound to the token and application being used is still being enforced) are carried out.

The approach described above allows the user to modify the risk profile of the device easily but ensures that the actual risk profile that is evaluated (by the PEP) is fine-grained in that it takes in consideration the applications installed on the device, the services they are accessing, and the operations the user has granted authorization to perform. In this way, the risk profile of a particular mobile device varies, and mobile devices used by different users to access the back-end applications have distinct and often quite different risk profiles. For a particular mobile device, real-time scope parameters for delegated authorization determine the security policy required on the device, preferably based on the service(s) the device is actually accessing.

The security policy enforcement agent may be a stand-alone module that is downloaded and installed in the mobile device, or it may be native to the device.

In a particular embodiment, the mobile device security policy platform as described comprises hardware, operating system and software resources that are necessary to implement the trusted storage and policy enforcement layers as described herein. For enhanced security, the various components may include appropriate cryptographic routines to generate cryptographic hashes, to store and manage session keys, to interact with external trusted routines and devices, to encrypt and decrypt data, to generate digital signatures, and the like.

As one of ordinary skill in the art also will appreciate, the technique shown in FIG. 5, which is merely representative, provides an effective way of constraining information flows at run-time to prevent data leakage between enterprise and personal applications executing on the mobile device.

The subject matter described herein has significant advantages over the prior art. It enables enforcement of device security policy based on authorized scope for particular mobile applications at the time the applications are used. The authorization server tracks scope for applications on a per device basis. While prior solutions only take into account the actual applications installed on the mobile device in order to determine a risk profile, the approach herein involves identifying and considering the services those applications are accessing, and the scope of operations the user has granted the device authorization to perform, as well as what applications are actively in use. The approach vastly improves user interaction experience on the mobile device by avoiding a "one size fits all" policy for devices. The techniques enables and provides for a more accurate risk profile to be developed and enforced for each device, and the solution enables much more flexibility in how it increases or decreases the security policy constraints based on the determined risk profile. With this approach, more burdensome security requirements are only imposed on the device user when high-value operations are being performed.

More generally, the approach enables many different types of security policies to be enforced on the device, and it enables dynamic change of policies at run-time. This approach ensures that data leakage between enterprise and personal applications is prevented but in doing so does not unnecessarily restrict the usability of the device. As a consequence, end users may be trusted to use their own personal devices even to support use with enterprise (or cloud-based) applications.

An even more fine level of control may be implemented by the enterprise by restricting the degree to which an end user is permitted to delegate (to its resident security policy enforcement agent) authorization to access a particular secure application. Thus, for example, a particular enterprise security policy may restrict mobile device access to sensitive enterprise data on an enterprise server if the access occurs over a public WiFi network. In this scenario, the authorization server may be configured to deny such access when the user attempts to grant authorization to the device.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, JSON, REST, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The policy management system or components thereof may be hosted in the cloud.

Still more generally, the subject matter described herein can take the form of an entirely hardware embodiment, an entirely software embodiment or an embodiment containing both hardware and software elements. In a preferred embodiment, the security policy enforcement agent is implemented in software, which includes but is not limited to firmware, resident software, microcode, and the like. Furthermore, the device-specific policy enforcement functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific and enterprise-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the policy management functionality provided herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) or JavaScript Object Notation (JSON) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The invention claimed is:

1. A method to enforce an enterprise security policy when a request for access to a service of the enterprise is initiated at a mobile device having a security policy enforcement agent and at least one personal application, comprising:
   responsive to authentication of a user that delegates from the user to the mobile device an authorization to access the service according to a scope of operations defined by the user of the mobile device and by which the user is permitted to delegate to the mobile device that authorization, providing a notification to the mobile device security policy enforcement agent that a security policy associated with the mobile device has changed as a result of the delegation, the changed security policy requiring at least one additional security constraint as determined by the enterprise security policy and being based in part on the user-defined scope of operations;
   responsive to receiving a notification from the mobile device security policy enforcement agent that the additional security constraint that is based in part on the user-defined scope of operations has been met at the mobile device, providing an authorization token to the mobile device;
   responsive to a subsequent receipt of the authorization token from the mobile device together with a request that encapsulates information identifying what security policy is in use for this access, determining whether the authorization token is valid and whether the changed security policy is in force at the mobile device; and
   responsive to a determination that the authorization token is valid and that the changed security policy is in force at the mobile device, permitting access to the service.

2. The method as described in claim 1 wherein the determination that the changed security policy is in force at the mobile device further includes:
   verifying whether the user has complied with the security policy as changed to reflect the additional security constraint for this service access.

3. The method as described in claim 1 wherein the determination that the changed security policy is in force at the mobile device further includes:
   contacting a security policy agent associated with the mobile device to query whether the security policy associated with the authorization and that is bound to the authorization token has been enforced for this particular access to the service; and
   receiving an affirmative response to the query.

4. The method as described in claim 1 further including denying access to the service if the changed security policy is not in force at the mobile device.

5. The method as described in claim 4 further including revoking the authorization token.

6. The method as described in claim 1 further including tracking an authorization scope for applications on the mobile device by maintaining a mapping that associates a service and its authorization scope to a security policy requirement level that defines one or more security policy requirements for the mobile device, wherein the authorization scope is based at least in part on the user-defined scope of operations.

7. The method as described in claim 6 further including providing the mobile device with the one or more security policy requirements.

8. The method as described in claim 1 further including:
   providing the mobile device, in addition to the authorization token, a signed version of the changed security policy;
   wherein the determination that the changed security policy is in force at the mobile device includes validating receipt of the signed version of the changed security policy.

9. The method as described in claim 1 wherein the mobile device has a risk profile that is fine-grained, based on a combination of applications installed on the mobile device and actively in use, one or more other services those applications are accessing, and the scope of operations defined by the user.

10. Apparatus to enforce an enterprise security policy when a request for access to a service of the enterprise is initiated at a mobile device having a security policy enforcement agent and at least one personal application, comprising:
   a processor;
   computer memory holding computer program instructions executed by the processor perform a set of operations, the operations comprising:
      responsive to authentication of a user that delegates from the user to the mobile device an authorization to access the service according to a scope of operations defined by the user of the mobile device and by which the user is permitted to delegate to the mobile device that authorization, providing a notification to the mobile device security policy enforcement agent that a security policy associated with the mobile device has changed as a result of the delegation, the changed security policy requiring at least one additional security constraint as determined by the enterprise security policy and being based in part on the user-defined scope of operations;
      responsive to receiving a notification from the mobile device security policy enforcement agent that the additional security constraint that is based in part on the user-defined scope of operations has been met at the mobile device, providing an authorization token to the mobile device;
      responsive to a subsequent receipt of the authorization token from the mobile device together with a request that encapsulates information identifying what security policy is in use for this access, determining whether the authorization token is valid and whether the changed security policy is in force at the mobile device; and responsive to a determination that the authorization token is valid and that the changed security policy is in force at the mobile device, permitting access to the service.

11. The apparatus as described in claim 10 wherein the determination that the changed security policy is in force at the mobile device further includes:
verifying whether the user has complied with the security policy as changed to reflect the additional security constraint for this service access.

12. The apparatus as described in claim 10 wherein the determination that the changed security policy is in force at the mobile device further includes:
contacting a security policy agent associated with the mobile device to query whether the security policy associated with the authorization and that is bound to the authorization token has been enforced for this particular access to the service; and
receiving an affirmative response to the query.

13. The apparatus as described in claim 10 wherein the set of operations further includes denying access to the service when the changed security policy is not in force at the mobile device.

14. The apparatus as described in claim 13 wherein the set of operations further includes revoking the authorization token.

15. The apparatus as described in claim 10 wherein the set of operations further includes tracking an authorization scope for applications on the mobile device by maintaining a mapping that associates a service and its authorization scope to a security policy requirement level that defines one or more security policy requirements for the mobile device, wherein the authorization scope is based at least in part on the user-defined scope of operations.

16. The apparatus as described in claim 15 wherein the set of operations further includes providing the mobile device with the one or more security policy requirements.

17. The apparatus as described in claim 10 wherein the mobile device has a risk profile that is fine-grained, based on a combination of applications installed on the mobile device and actively in use, one or more other services those applications are accessing, and the scope of operations defined by the user.

18. A computer program product in a non-transitory computer readable storage medium for use in a data processing system, the computer program product holding computer program instructions which, when executed by the data processing system, perform a set of operations to enforce an enterprise security policy when a request for access to a service of the enterprise is initiated at a mobile device having a security policy enforcement agent and at least one personal application, the set of operations comprising:
responsive to authentication of a user that delegates from the user to the mobile device an authorization to access the service according to a scope of operations defined by the user of the mobile device and by which the user is permitted to delegate to the mobile device that authorization, providing a notification to the mobile device security policy enforcement agent that a security policy associated with the mobile device has changed as a result of the delegation, the changed security policy requiring at least one additional security constraint as determined by the enterprise security policy and being based in part on the user-defined scope of operations;
responsive to receiving a notification from the mobile device security policy enforcement agent that the additional security constraint that is based in part on the user-defined scope of operations has been met at the mobile device, providing an authorization token to the mobile device;
responsive to a subsequent receipt of the authorization token from the mobile device together with a request that encapsulates information identifying what security policy is in use for this access, determining whether the authorization token is valid and whether the changed security policy is in force at the mobile device; and
responsive to a determination that the authorization token is valid and that the changed security policy is in force at the mobile device, permitting access to the service.

19. The computer program product as described in claim 18 wherein the determination that the changed security policy is in force at the mobile device further includes:
verifying whether the user has complied with the security policy as changed to reflect the additional security constraint for this service access.

20. The computer program product as described in claim 18 wherein the determination that the changed security policy is in force at the mobile device further includes:
contacting a security policy agent associated with the mobile device to query whether the security policy associated with the authorization and that is bound to the authorization token has been enforced for this particular access to the service; and
receiving an affirmative response to the query.

21. The computer program product as described in claim 18 wherein the set of operations further includes denying access to the service when the changed security policy is not in force at the mobile device.

22. The computer program product as described in claim 21 wherein the set of operations further includes revoking the authorization token.

23. The computer program product as described in claim 18 wherein the set of operations further includes tracking an authorization scope for applications on the mobile device by maintaining a mapping that associates a service and its authorization scope to a security policy requirement level that defines one or more security policy requirements for the mobile device, wherein the authorization scope is based at least in part on the user-defined scope of operations.

24. The computer program product as described in claim 23 wherein the set of operations further includes providing the mobile device with the one or more security policy requirements.

25. The computer program product as described in claim 18 wherein the mobile device has a risk profile that is fine-grained, based on a combination of applications installed on the mobile device and actively in use, one or more other services those applications are accessing, and the scope of operations defined by the user.

26. A mobile device, comprising:
a hardware processor;
computer memory;
a personal application;
a mobile application executed by the hardware processor and operative to request a service of an enterprise from a secure back-end application, wherein according to a scope of operations defined by a user of the mobile device the user is permitted to delegate to the mobile device an authorization to access the service directly, the mobile application responsive to receipt of data from the user to request an authentication to delegate from the user to a security policy enforcement agent of the mobile device the authorization to access the secure back-end application according to the scope of operations defined by the user of the mobile device; and the security policy enforcement agent executed by the hardware processor and responsive to the user authentication for receiving a notification that a risk profile associated with the mobile device has changed as a result of the delegation and that a new security policy for the mobile device requires validation of at least one additional security constraint at the mobile device, the security policy enforcement agent enforcing the new security policy to enable the mobile application to obtain access to the secure back-end application according to the user-defined scope of operations by (i) determining that the at least one additional security constraint has been met at the mobile device, (ii) providing an indication to an authorization server that the at least one additional security constraint has been met; (iii) responsive to providing the indication, receiving from the authorization server an authorization token that is scoped to the authorization to include access to the secure back-end application; and (iv) subsequently providing the authorization token for verification together with a request that encapsulates information identifying what security policy is in use to attempt to obtain the service from the secure back-end application.

* * * * *